J. J. VOORHEES.
INNER TUBE FOR PNEUMATIC TIRES.
APPLICATION FILED APR. 8, 1915.
1,155,775.
Patented Oct. 5, 1915.
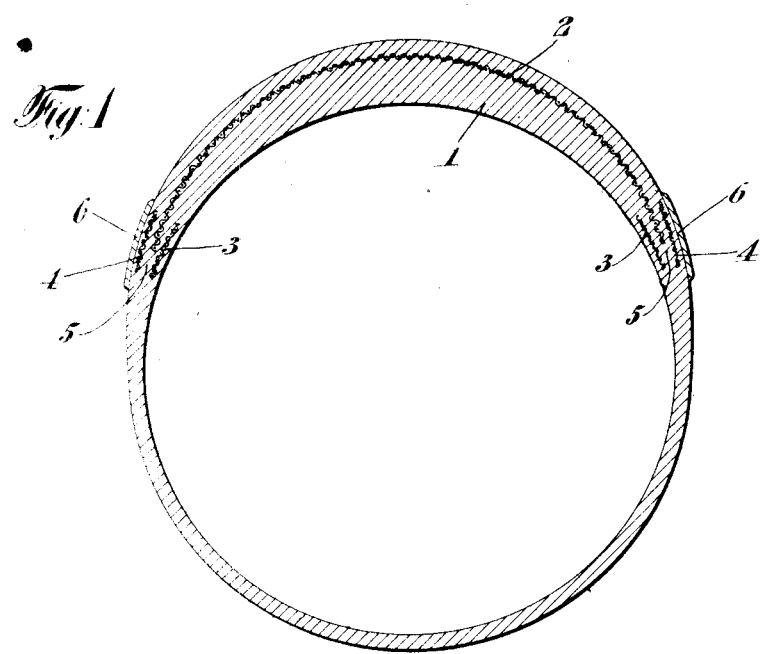
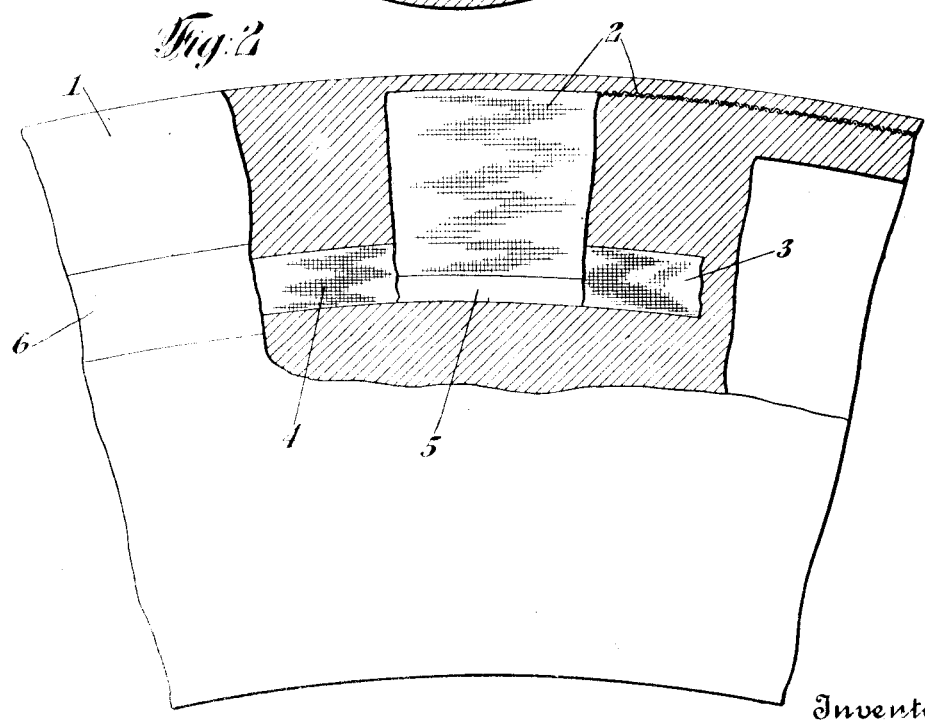
Inventor
John J. Voorhees
By his Attorneys
Prindle Wright & Small

UNITED STATES PATENT OFFICE.

JOHN J. VOORHEES, OF JERSEY CITY, NEW JERSEY, ASSIGNOR TO BROWN PERFECTION TUBE COMPANY, OF NEW YORK, N. Y., A CORPORATION OF NEW YORK.

INNER TUBE FOR PNEUMATIC TIRES.

1,155,775.     Specification of Letters Patent.     Patented Oct. 5, 1915.

Application filed April 8, 1915. Serial No. 19,854.

*To all whom it may concern:*

Be it known that I, JOHN J. VOORHEES, of Jersey City, in the county of Hudson and in the State of New Jersey, have invented a certain new and useful Improvement in Inner Tubes for Pneumatic Tires, and do hereby declare that the following is a full, clear, and exact description thereof.

The object of my invention has been to provide an improvement in inner tubes for pneumatic tires having a thickened tread held in compression by a strip of fabric, which improvement shall prevent the rubber from rupturning at the edges of the said strip, and to such ends, my invention consists in the improvement in inner tubes for pneumatic tires hereinafter specified.

In the accompanying drawings, Figure 1 is a cross-sectional view of an inner tube embodying my invention, and Fig. 2 is a partial broken side elevation of the tube of Fig. 1.

While my invention is capable of application to various forms of inner tubes for pneumatic tires, I have chosen as the best embodiment thereof known to me to illustrate it by its application to a tube, such as is shown in the application for patent of John H. Brown, Serial No. 704,638. Such tube comprises a thickened tread 1, which is held in compression by a strip of fabric 2, so that punctures in the tread portion of the tube are closed by the expansion of the rubber under compression, and the escape of air is prevented. Since it is necessary that the tube be capable of expanding to fit the shoe in which it is inclosed, and since the fabric (which is preferably duck) is substantially unyielding, the rubber of the tubes will occasionally break at the edges of the fabric, and this is especially true if the edges of the fabric are located at the sides where the maximum bending occurs when the tube is compressed.

I have found that I can substantially overcome the said difficulties by the following means: At the edge of the fabric I place a strip of fabric or fillet 3 which is preferably cut on the bias, so as to make it elastic, and which particularly over or underlies the edge of the strip 2. I find that a better effect is obtained by the use also of two fillets 3 and 4 on the opposite side of the edge of the tread strip 2 and I preferably put a coating or strip of rubber 5 between the fillets to correspond with the thickness of the strip 2. The strips 3 and 4 are also preferably coated with rubber or "frictioned" as it is known in the trade. I prefer also to use the further expedient of a strip of rubber 6 which is formed on the outer side of the tube, and preferably at the same time as the tube is vulcanized, and which strip of rubber prevents wear and chafing from uncovering the edges of the fabric.

I claim:

1. An inner tube for pneumatic tires, comprising a thickened tread, a strip of fabric holding said tread in compression, and a fillet overlapping the edge of said strip and embedded in the rubber of the tube.

2. An inner tube for pneumatic tires, comprising a thickened tread, a strip of fabric holding said tread in compression, and a fillet on each side of said strip and overlying its edge and embedded in the rubber of the tube.

3. An inner tube for pneumatic tires, comprising a thickened tread, a strip of fabric holding said tread in compression, a fillet on each side of said strip overlying its edge and embedded in the rubber of the strip, and a layer of rubber between said fillets and substantially equal in thickness to the thickness of said first mentioned strip of fabric.

4. An inner tube for pneumatic tires, comprising a thickened tread, a strip of fabric holding said tread in compression, a fillet on each side of said strip overlying its edge and embedded in the rubber of the strip, and a layer of rubber between said fillets and substantially equal in thickness to the thickness of said first mentioned strip of fabric, said fillets being frictioned.

5. An inner tube for pneumatic tires, comprising a thickened tread, a strip of fabric holding said tread in compression, and a fillet on each side of said strip and overlying its edge and embedded in the rubber of the strip, said fillets being made of fabric which is elastic transversely.

6. An inner tube for pneumatic tires, comprising a thickened tread, a strip of fabric holding said tread in compression, a fillet on each side of said strip overlying its edge and embedded in the rubber of the strip, and a layer of rubber between said fillets and substantially equal in thickness to the thickness of said first mentioned strip of fabric, said fillets being made of fabric which is elastic transversely.

7. An inner tube for pneumatic tires, comprising a thickened tread, a strip of fabric holding said tread in compression, a fillet on each side of said strip overlying its edge and embedded in the rubber of the strip, and a layer of rubber between said fillets and substantially equal in thickness to the thickness of said first mentioned strip of fabric, said fillets being frictioned, and being made of fabric which is elastic transversely.

In testimony that I claim the foregoing I have hereunto set my hand.

JOHN J. VOORHEES.

Witnesses:
    EDWIN J. PRINDLE,
    J. FREUDENVALL.